(12) United States Patent
Amano et al.

(10) Patent No.: US 6,984,056 B2
(45) Date of Patent: Jan. 10, 2006

(54) LIGHTING DEVICE

(75) Inventors: Mamoru Amano, Ehime (JP); Shuho Yamasaki, Ehime (JP)

(73) Assignee: Harison Toshiba Lighting Corporation, (JP)

( * ) Notice: Subject to any disclaimer, the term of this patent is extended or adjusted under 35 U.S.C. 154(b) by 180 days.

(21) Appl. No.: 10/649,900

(22) Filed: Aug. 28, 2003

(65) Prior Publication Data

US 2004/0047149 A1    Mar. 11, 2004

(30) Foreign Application Priority Data

Aug. 30, 2002  (JP) .............................. 2002-255571
Nov. 11, 2002  (JP) .............................. 2002-326842

(51) Int. Cl.
*F21S 4/00*   (2006.01)
*F21V 23/06*  (2006.01)

(52) U.S. Cl. .................... 362/225; 362/221; 362/260; 439/86; 439/235; 439/242

(58) Field of Classification Search ................ 362/217, 362/221–225, 260, 306, 369, 390; 349/70; 439/86, 226, 235, 242, 243, 931
See application file for complete search history.

(56) References Cited

U.S. PATENT DOCUMENTS

| | | | |
|---|---|---|---|
| 3,680,037 A | * | 7/1972 | Nellis et al. ................ 439/591 |
| 5,604,410 A | * | 2/1997 | Vollkommer et al. ....... 315/246 |
| 5,805,251 A | * | 9/1998 | Ozawa ....................... 349/110 |
| 6,341,879 B1 | * | 1/2002 | Skinner et al. ............. 362/225 |
| 6,441,874 B1 | * | 8/2002 | Saito et al. ................... 349/70 |
| 6,749,315 B2 | * | 6/2004 | Moon et al. ................ 362/225 |
| 6,794,801 B2 | * | 9/2004 | Yasuda et al. ............... 313/46 |
| 6,796,678 B2 | * | 9/2004 | Moon ......................... 362/225 |

FOREIGN PATENT DOCUMENTS

JP        06150989 A    *    5/1994

* cited by examiner

*Primary Examiner*—Alan Cariaso
(74) *Attorney, Agent, or Firm*—Banner & Witcoff, Ltd.

(57) ABSTRACT

A lighting device according to an embodiment of the present invention includes a pair of sockets 22 made of a soft and elastic conductor and arranged facing each other, with which electric power is supplied to EEFL lamps 21. A plurality of lamp inserting holes 220 is provided along the longitudinal direction of the socket 22. External electrodes 214 at the both ends of EEFL lamps 21 are pressed into each of the lamp inserting holes. These sockets 22 are supported and coated by socket holders 23 made of an insulator having higher rigidity than the sockets 22 respectively.

29 Claims, 4 Drawing Sheets

LIGHTING DEVICE

The present application claims priority of Japan Application No. 2002-255571 filed Aug. 30, 2002; and Japan Application No. 2002-326842 filed Nov. 11, 2002.

BACKGROUND OF THE INVENTION

The present invention relates to a flat panel type lighting device utilizing a dielectric barrier type external electrode fluorescent lamp (hereinafter referred to as a "EEFL lamp"), and especially relates to a socket assembly for supplying electric power to a plurality of EEFL lamps.

A flat panel type lighting device utilizing EEFL lamp is widely used for a back light unit for a display unit requiring high brightness such as a liquid crystal display TV set.

In such conventional back light unit, a plurality of EEFL lamps is arranged in parallel. External electrodes at the both ends of each lamp are inserted into each of the plurality of capsule type sockets, which are arranged in a pair of power supply units. A high frequency voltage is applied between the pair of power supply units, which light each lamp by discharge (refer to Japanese Patent Application Laid-Open 2002-8408).

In such conventional back light unit, the external electrode portions of the both ends of EEFL lamp are inserted into a plurality of capsule type sockets arranged facing each other in a pair of power supply units. High level of manufacturing and assembling techniques are necessary for the power supply units, because from 10 to 20 EEFL lamps should be assembled which are composed of glass tubes, for example, having an outer diameter of 3 mm and a length of 300 to 500 mm. More specifically, in the manufacturing and assembling of this power supply unit, the both ends of a number of slender and fragile EEFL lamps must be inserted into capsule type sockets in the pair of power supply units, which are spaced with each other. Because of this reason, If the plurality of capsule type sockets are not arranged in the pair of power supply units with an accurate dimension and position, twist or distortion might occur in the plurality of EEFL lamps arranged in parallel. Thus, not only insufficient electrical contact is caused but also a mechanical stress is imposed on the slender and fragile EEFL lamps, which are possibly destroyed.

In general, in such back light units, there is a tendency that the length and numbers of EEFL lamps increase as a display scale becomes large and the resolution of a picture become high and thus there was a problem that a higher technique is required in manufacturing and assembling the power supply unit, resulting in the higher manufacturing cost.

The present invention provides a socket assembly, which is easily manufactured and assembled for the demand of small diameter, long size, and increasing number of EEFL lamps composing the flat panel type lighting device, and which is capable of stable lighting performance with a firm electric contact. It is another object of the present invention to provide a lighting device provided with such socket assembly.

BRIEF SUMMARY OF THE INVENTION

A lighting device according to an embodiment of the present invention includes a first and a second socket assembly. The first socket assembly has a first socket which is made of a soft and elastic bar shape conductor, on which a plurality of lamp inserting holes are formed along a longitudinal direction, and a first socket holder for receiving the socket, which is made of an insulator having higher rigidity than the socket. The second socket assembly has a second socket which is composed of a soft and elastic bar shape conductor and on which a plurality of lamp inserting holes are formed along a longitudinal direction, and a second socket holder for receiving the socket, which is made of an insulator having higher rigidity than the socket and is placed to face the first socket assembly. The lighting device further includes a plurality of fluorescent lamps each one end of which is inserted in one of the plurality of lamp inserting holes of the first socket in the first socket assembly, and each other end of which is inserted in one of the plurality of lamp inserting holes of the second socket in the second socket assembly, and a high frequency power source which supplies a high frequency voltage between the first socket in the first socket assembly and the second socket in the second socket assembly.

In the lighting device according to an embodiment of the present invention, a plurality of fluorescent lamps is dielectric barrier type discharge lamps on both ends of which an external electrode are formed.

In the lighting device according to an embodiment of the present invention, the first socket is made of a conductive rubber, which is molded by silicone rubber mixed with carbon black.

Further, in the lighting device according to an embodiment of the present invention, the first socket is made of a conductive rubber, which is molded by silicone rubber mixed with carbon black of 30 to 40 wt. % and silica of 1 to 10 wt. %.

Further, in the lighting device according to an embodiment of the present invention, the external electrode of the dielectric barrier type discharge lamp has an outer diameter somewhat larger than the lamp inserting hole of the first or second socket, and has a length with which an end of the external electrode protrudes from the other side of the first or second socket when the external electrode is inserted in the lamp inserting hole.

Further, in the lighting device according to an embodiment of the present invention, the first or second socket is provided with a harness-connecting portion, which is a concave portion formed at an end of the socket, and a metal fitting for screwing the harness terminal connected with the high frequency power source is fitted in the concave portion of the harness-connecting portion.

Further, in the lighting device according to an embodiment of the present invention, the harness-connecting portion is provided with a metal nut for screwing the harness terminal, which is fixed by burning on the bar shape conductor forming the first or second socket.

Further, in the lighting device according to an embodiment of the present invention, the metal nut has a peripheral shape of a polygon or a circle with projections.

Further, in the lighting device according to an embodiment of the present invention, a screw boss is fixed on one end of the first or second socket holder and an insertion hole for inserting the screw boss is formed on one face of the first or the second socket where the harness connecting portion is provided. On the other face of the first or second socket holder, a through hole, which communicates with the inserting hole, is provided. The first or second socket is fixed on the first or second socket holder respectively, by coupling the screw inserted in the through hole with the screw boss.

Further, in the lighting device according to an embodiment of the present invention, the first socket is provided with the harness-connecting portion on its one end portion, and the second socket is provided with the harness-connecting portion on its end portion, which is located at an opposite side of the end portion of the first socket. Thus, each circuit for supplying a high frequency voltage to each of the discharge lamps from the high frequency power source has a nearly equal circuit length.

Further, in the lighting device according to an embodiment of the present invention, a plurality of fixing protrusions are provided along the longitudinal direction on the first or second socket holder, and a plurality of fixing holes having an opening area somewhat smaller than the cross section of the fixing protrusions are provided along the longitudinal direction on the first or second socket. Thus, the first or second socket is received in the first or second socket holder by pressing the plurality of fixing protrusions into the plurality of fixing holes.

Further, in the lighting device according to an embodiment of the present invention, the first or second socket holder is made of a flame resistant insulator, and is constructed to cover the side face of the first or second socket except for the face where the plurality of lamp insertion holes are open.

Further, a socket assembly for a fluorescent lamp according to another embodiment of the present invention has a first and second socket assembly. The first socket assembly includes a first socket which is made of a soft and elastic bar shape conductor which is provided with a plurality of lamp inserting holes along a longitudinal direction, and a first socket holder in which the socket is received and which is made of an insulator having higher rigidity than the socket. The second socket assembly includes a second socket which is made of a soft and elastic bar shape conductor which is provided with a plurality of lamp inserting holes along a longitudinal direction, and a second socket holder in which the socket is received, which is made of an insulator having higher rigidity than the socket, and which faces the first socket assembly with a space.

Further, in the socket assembly for a fluorescent lamp according to another embodiment of the present invention, the first socket is made of a conductive rubber, which is molded by silicone rubber mixed with carbon black.

Further, in the socket assembly for a fluorescent lamp according to another embodiment of the present invention, the first socket is made of a conductive rubber, which is molded by silicone rubber mixed with carbon black of 30 to 40 wt. % and silica of 1 to 10 wt. %.

Further, in the socket assembly for a fluorescent lamp according to another embodiment of the present invention, the first or second socket is provided with a harness connecting portion, which is a concave portion formed at an end of the socket, and a metal fitting for screwing the harness terminal connected with the high frequency power source is fitted in the concave portion of the harness-connecting portion.

Further, in the socket assembly for a fluorescent lamp according to another embodiment of the present invention, the harness-connecting portion is provided with a metal nut for screwing the harness terminal, which is fixed by burning on the bar shape conductor forming the first or second socket.

Further, in the socket assembly for a fluorescent lamp according to another embodiment of the present invention, the metal nut has a peripheral shape of a polygon or a circle with projections.

Further, in the socket assembly for a fluorescent lamp according to another embodiment of the present invention, a screw boss is fixed on one end of the first or second socket holder and an insertion hole for inserting the screw boss is formed on one face of the first or the second socket where the harness connecting portion is provided. On the other face of the first or second socket holder, a through hole, which communicates with the inserting hole, is provided. The first or second socket is fixed on the first or second socket holder respectively, by coupling the screw inserted in the through hole with the screw boss.

Further, in the socket assembly for a fluorescent lamp according to another embodiment of the present invention, a plurality of fixing protrusions are provided along the longitudinal direction on the first or second socket holder, and a plurality of fixing holes having an opening area somewhat smaller than the cross section of the fixing protrusions are provided along the longitudinal direction on the first or second socket. Thus, the first or second socket is received in the first or second socket holder by pressing the plurality of fixing protrusions into the plurality of fixing holes.

Further, in the socket assembly for a fluorescent lamp according to another embodiment of the present invention, the first or second socket holder is made of a flame resistant insulator, and is constructed to cover the side face of the first or second socket except for the face where the plurality of lamp insertion holes are open.

According to a further different embodiment of the present invention, a power supply unit for a fluorescent lamp has a first and a second socket assembly. The first socket assembly includes a first socket which is made of a soft and elastic bar shape conductor which is provided with a plurality of lamp inserting holes along a longitudinal direction, and a first socket holder in which the socket is received and which is made of an insulator having higher rigidity than the socket. The second socket assembly includes a second socket which is made of a soft and elastic bar shape conductor which is provided with a plurality of lamp inserting holes along a longitudinal direction, and a second socket holder in which the socket is received, which is made of an insulator having higher rigidity than the socket, and which faces the first socket assembly with a space. The power supply unit for an external electrode fluorescent lamp further includes a high frequency power source, which supplies a high frequency voltage between the first socket of the first socket assembly and the second socket of the second socket assembly.

Further, in the power supply unit for a fluorescent lamp, the first socket is made of a conductive rubber, which is molded by silicone rubber mixed with carbon black.

Further, in the power supply unit for a fluorescent lamp, the first socket is made of a conductive rubber, which is molded by silicone rubber mixed with carbon black of 30 to 40 wt. % and silica of 1 to 10 wt. %.

Further, in the power supply unit for a fluorescent lamp, the first socket is provided with the harness-connecting portion on its one end portion, and the second socket is provided with the harness-connecting portion on its end portion, which is located at an opposite side of the end portion of the first socket. Thus, each circuit for supplying a high frequency voltage to each of the plurality discharge lamps of dielectric barrier type from the high frequency power source has a nearly equal circuit length.

According to a further different embodiment of the present invention, a liquid crystal display unit has a first and a second socket assembly. The first socket assembly includes a first socket which is made of a soft and elastic bar shape conductor which is provided with a plurality of lamp inserting holes along a longitudinal direction, and a first socket holder in which the socket is received and which is made of an insulator having higher rigidity than the socket.

The second socket assembly includes a second socket which is made of a soft and elastic bar shape conductor which is provided with a plurality of lamp inserting holes along a longitudinal direction, and a second socket holder in which the socket is received, which is made of an insulator having higher rigidity than the socket, and which faces the first socket assembly with a space.

The liquid crystal display unit further includes a plurality of fluorescent lamps including a glass vessel, one end of which is inserted into one of the lamp inserting holes of the first socket of the first socket assembly and the other end of which is inserted into one of the lamp inserting holes of the second socket of the second socket assembly.

The liquid crystal display unit further includes a high frequency power source, which supplies a high frequency voltage between the first socket of the first socket assembly and the second socket of the second socket assembly and a liquid crystal display panel arranged in the vicinity of the plurality of external electrode fluorescent lamps.

DETAILED DESCRIPTION OF THE INVENTION

Figure 1:
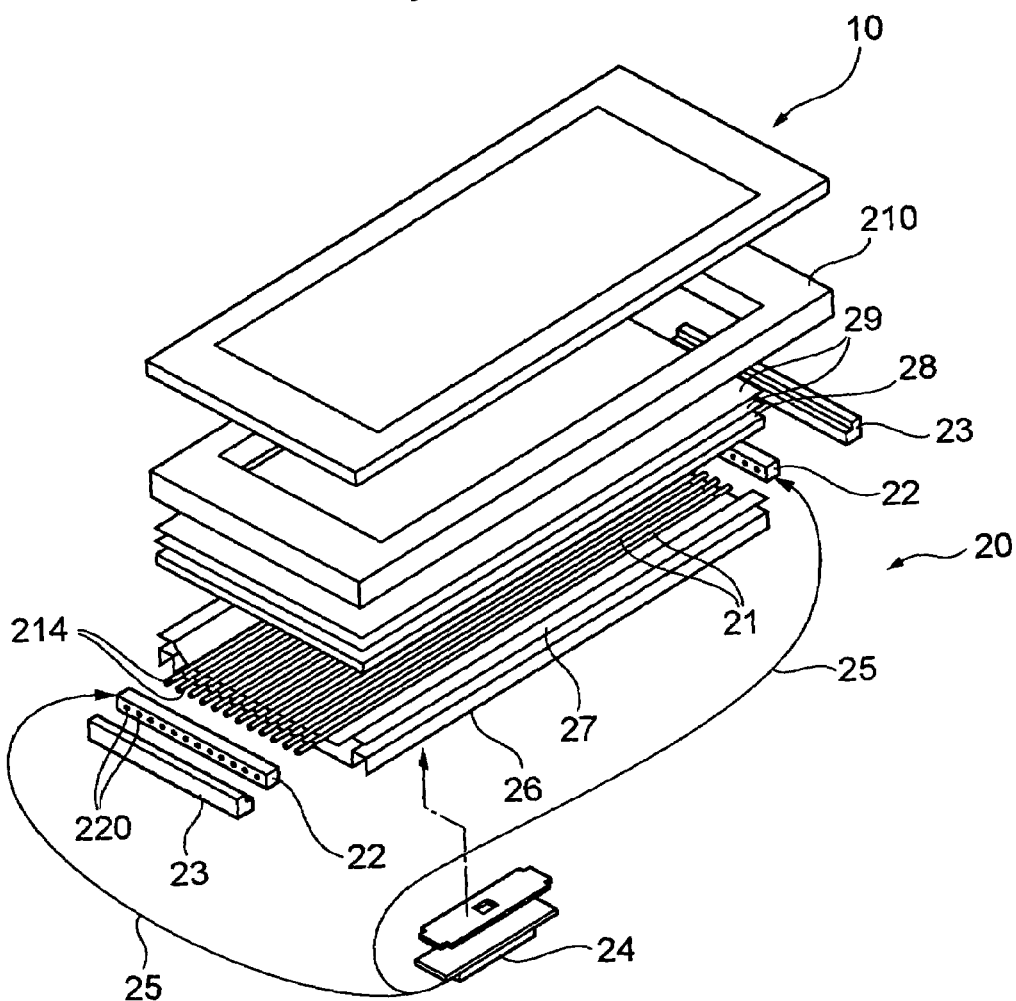
FIG. 1 is an exploded diagram perspectively showing an embodiment of the liquid crystal display unit according to the present invention.
Figure 2:
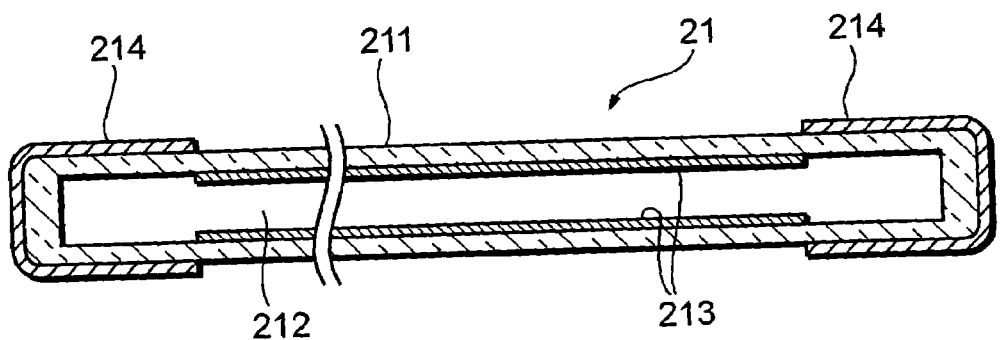
FIG. 2 is a vertical section showing a construction of the EEFL lamp shown in FIG. 1.

Embodiments according to the present invention will be explained below in detail referring to the appended figures. FIG. 1 is an exploded diagram perspectively showing an embodiment of the liquid crystal display unit according to the present invention. FIG. 2 is a vertical section showing a construction of the EEFL lamp shown in FIG. 1.

Figure 3:
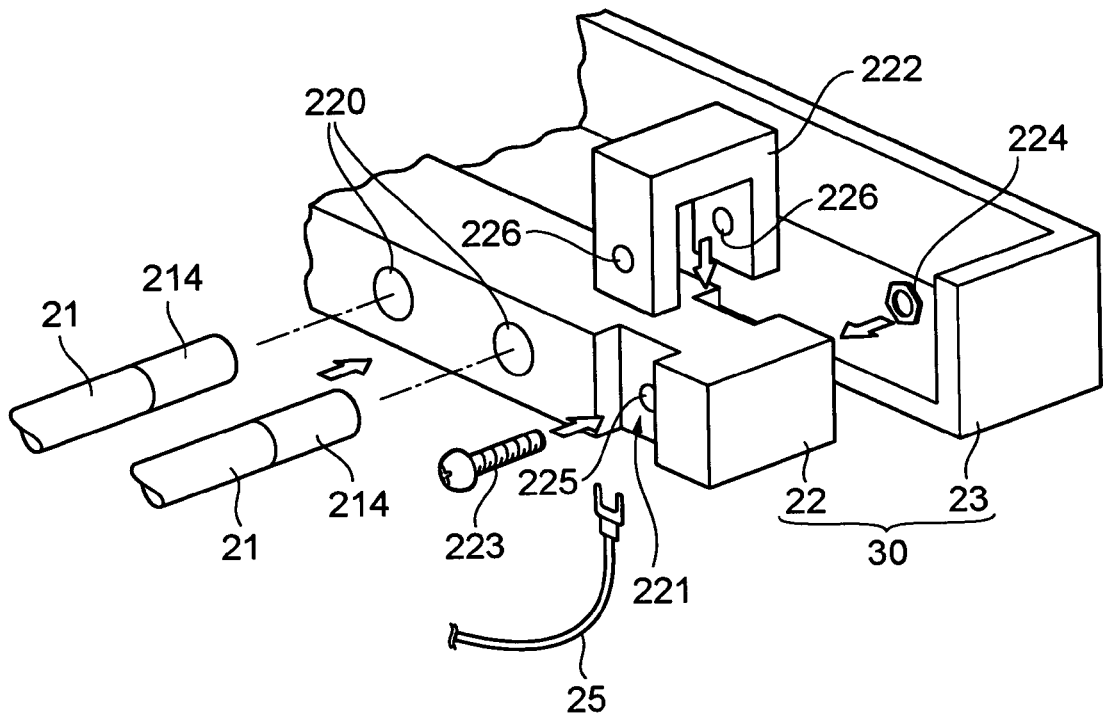
FIG. 3 is an exploded diagram perspectively showing a harness-connecting portion of a socket assembly for EEFL lamps.

FIG. 3 is an exploded diagram perspectively showing a harness-connecting portion of a socket assembly for EEFL lamps.

The liquid crystal display unit is composed of a liquid crystal panel 10, and a lighting device 20, which is a back light unit for the liquid crystal panel 10. The liquid crystal panel 10 is a color liquid crystal panel generally known.

The lighting device 20 for supplying backlight to the liquid crystal panel 10 is provided with a number of EEFL lamps 21 arranged in parallel. A pair of sockets 22 and a pair of socket holders 23 is arranged facing each other at the both ends of these lamps. The socket 22 and the socket holder 23 arranged at one end of the EEFL lamps 21 compose a first socket assembly. And the socket 22 and the socket holder 23 arranged at other end of the EEFL lamps 21 compose a second socket assembly, which faces the first socket assembly. A high frequency voltage is supplied to a pair of sockets 22 through a pair of harness 25 from an inverter 24, which is a high frequency power supply. Here, each of the harnesses 25 is connected with the opposite ends of each of the sockets 22 to each other. A pair of socket holder 23 is fixed at both ends of a lower frame 26. On the lower frame 26, a reflection plate 27 is provided, which reflects the light from the EEFL lamps 21 to a predetermined direction (upward in FIG. 1). On the upside of the EEFL lamps 21, a diffusion plate 28 and a diffusion sheet 29 are laminated to diffuse the light radiated from the EEFL lamps 21 uniformly. The liquid crystal panel 10 is provided on the laminated layers of these diffusion plate 28 and diffusion sheet 29 with an upper frame 210 interposed there between.

As shown in FIG. 2, the EEFL lamp 21 has a tubular glass lamp vessel 211, in which a filler 212 composed of a mixed gas of mercury and rare gas. A phosphor layer 213 is provided on an inner surface of the glass lamp vessel 211, if necessary. An external electrode 214 is provided on an external surface of the glass vessel 211 at its both ends. The external electrode 214 is made of a conductor having such a shape as a film, a coil or a tape. Especially, an external electrode 214 which is made of aluminum tape or a solder layer, which is formed by dipping the both ends of the glass vessel 211 in an ultrasonic soldering pot have good conductivity and are easy to manufacture.

FIG. 3 is an exploded diagram for explaining a structure of a part of the socket assembly shown in FIG. 1. A socket 22 is made of a bar like conductor, which is made of silicone rubber mixed with carbon particle at an appropriate ratio and is molded into a bar. More specifically, the conductor is a soft and black conductive rubber with hardness of 53°, which is manufactured by mixing silicone with carbon black of 30 to 40 wt. % and silica of 1 to 10 wt. % and is formed by molding. On the socket 22, a plurality of lamp inserting holes 220, which penetrate in horizontal direction to the opposite face, are provided at positions evenly spaced along a longitudinal direction as shown in FIG. 3. The diameters of these lamp inserting holes are selected as smaller than an outer diameter 211 of EEFL lamp 21, so that the external electrode 214 is made an electrical contact with the socket 22 and is supported mechanically at the same time by pressing the external electrode 214 into the lamp inserting hole 220. It is desirable that the hardness of the conductive rubber is in a rage of 50° to 65° taking the following situation into consideration. The harder the rubber the lower the resistance, but the harder rubber may injure the external electrode 214.

Figure 4:
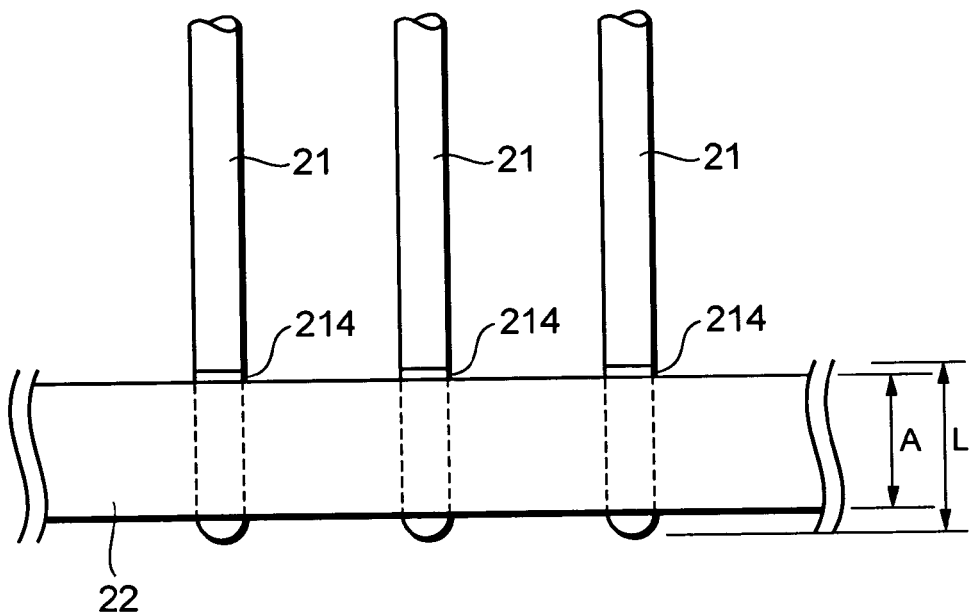
FIG. 4 is a plan view partly showing the socket assembly in the embodiment shown in FIG. 1, in which the EEFL lamps are installed.

Here, the length L of the external electrode 214 of the EEFL lamp 21 along its axis is selected as a little bit longer than a thickness A of the socket 22 along the lamp axis as shown in FIG. 4. The reason is that, even though any positional misalignment arises along the tube axis of the lamp when the external electrode 214 at the end of EEFL lamp 21 is inserted in the socket 22 by pressing, the socket 22 is always kept contact with the external electrode 214 with the whole length of the thickness A.

With the configuration, when a lot of EEFL lamps 21 are loaded to the lighting device 21, the socket 22 is made good contact with the external electrode 214 of the EEFL lamps with the whole thickness A of the socket 22 even if the EEFL lamps are somewhat displaced along the lamp axis direction. Thus, the resistance between the socket 22 and each of the external electrodes 214 is always kept nearly constant. As a result, brightness of each lamp is made uniform, by which uneven brightness in the display of the liquid crystal panel 10 is prevented and almost uniform brightness in whole display area is obtained.

Here, the external electrodes 214 shown in the above embodiment are not always necessary because the socket 22 is made of the conductive material.

Referring back to FIG. 3, a harness connecting portion 221 composed of a concave portion formed on both opposite surfaces is formed on one end portion of the socket 22. A "U" shape metal fitting 222, which fits the above concave portion is attached on the harness connecting portion. A screw through hole 225, which penetrates the socket 22, is formed on the concave portion of the harness-connecting portion. A screw through hole 226 is also formed on the metal fitting 222. The terminal portion of the harness 25, which is connected with the high frequency inverter 24, is fixed on the surface of the metal fitting 222 with a screw 223 and a nut 224. That is, the screw 223 is inserted through the screw through hole 225, 226 formed on the harness connecting-portion 221 and the metal fitting 222 respectively, and is screwed together with the nut 224 on the opposite surface of the metal fitting 222.

The socket holder 23 receives a soft socket 22 for keeping mechanical strength as well as for insulative coating of the conductive socket 22. The socket holder 23 is formed by molding with such incombustible resin as, for example, polycarbonate, having rigidity higher than the soft socket 22. The socket holder 23 receives the socket 22 so that a side face on which the lamps are inserted and an upper are exposed, and that a bottom face and a rear face are covered, when assembled as a lighting device.

A first socket assembly 30 of one side is composed of the combination of the socket 22 and socket holder 23. A second socket assembly 30 of a similar composition to the first one is arranged also on the other side of the EEFL lamp 21. The second socket assembly 30 has substantially the same structure as the first socket assembly, except the harness-connecting portion 221 of the first socket 22 is arranged on the opposite end of the second socket 22.

A plurality of EEFL lamps 21 is loaded between a pair of socket assemblies 30. That is, the external electrodes 211 provided on the both ends of each EEFL lamp are pressed into the socket inserting holes 220 of the socket 22 of each socket assembly 30. Two connecting terminals of the harnesses 25, which are connected with the inverter 24 are connected with the first and the second socket assembly 30.

In the liquid crystal display device thus arranged, a high frequency voltage is supplied from an inverter 24, which is a high frequency source, to a pair of sockets 22 through a pair of harnesses 25. In the device, a high frequency voltage is supplied to each socket 22 through the harness-connecting portion 221, which is provided on the opposite ends of a pair of sockets 22. The high frequency voltage is transmitted through the bar shaped conductor composed of conductive rubber forming each socket, and is supplied to the external electrodes 211 to discharge them simultaneously.

As explained above, since the socket 22 has a simple construction of forming lamp inserting holes 220 on a conductor made of a bar shape conductive rubber, it is easy to manufacture and cost reduction is possible. In the socket assembly 30, the socket 22 formed by a soft conductor and the socket holder 23 made of an insulator having higher rigidity than the conductor of the socket 22 are provided independently, so that the assembling of the socket assembly 30 becomes easier. More specifically, for loading a number of EEFL lamps 21, a number of EEFL lamps 21 are inserted into lamp inserting holes 220 of a pair of sockets 21, first. Thereafter, a pair of sockets 22 is received in a pair of socket holders 23. Since the slender socket 22 is wholly composed of a soft rubber material, the mechanical stress applied on a number of EEFL lamps inserted in the lamp inserting hole 220 may be reduced, so that the fragile EEFL lamps are prevented from being destroyed, which makes the work of assembling easier. After the socket 22 is received in the socket holder 23, the fragile EEFL lamps are prevented from being applied with stress from outside, because the socket holder 23 made of an insulator having high rigidity wholly supports the socket 22. However, the contact between the socket 22 and the external electrodes 211 of a number of EEFL lamps 21, which are inserted in the lamp inserting holes 220, is fully maintained and a reliable electric connection is secured, because the socket 22 is wholly made of a soft and elastic rubber material. Therefore, a fire accident owing to a poor contact between the socket 22 and the external electrode 214 is prevented during the use of the back light unit. Besides, an electric shock accident by touching the socket on which a high voltage is applied is also prevented from occurring because the socket 22 made of conductor is received in the socket holder 23 made of insulator.

Moreover, in the socket assembly 30 mentioned above, each EEFL lamp 21 is supplied with nearly equal high frequency voltage despite the longitudinal position of the socket 22, because the harness connecting portion 221 of the first socket 22 and of the second socket 22 are located on the opposite ends of the sockets 22 with each other. That is, in the socket assembly 30, the circuit length through which the high frequency voltage supplied on the harness-connecting portion 221 of the first socket 22 travels to the opposite side harness-connecting portion 221 of the second socket 22 via each EEFL lamp becomes nearly equal for each EEFL lamp. As a result, a lighting device is provided in which whole of the light emitting surface emits light uniformly.

Figure 5:
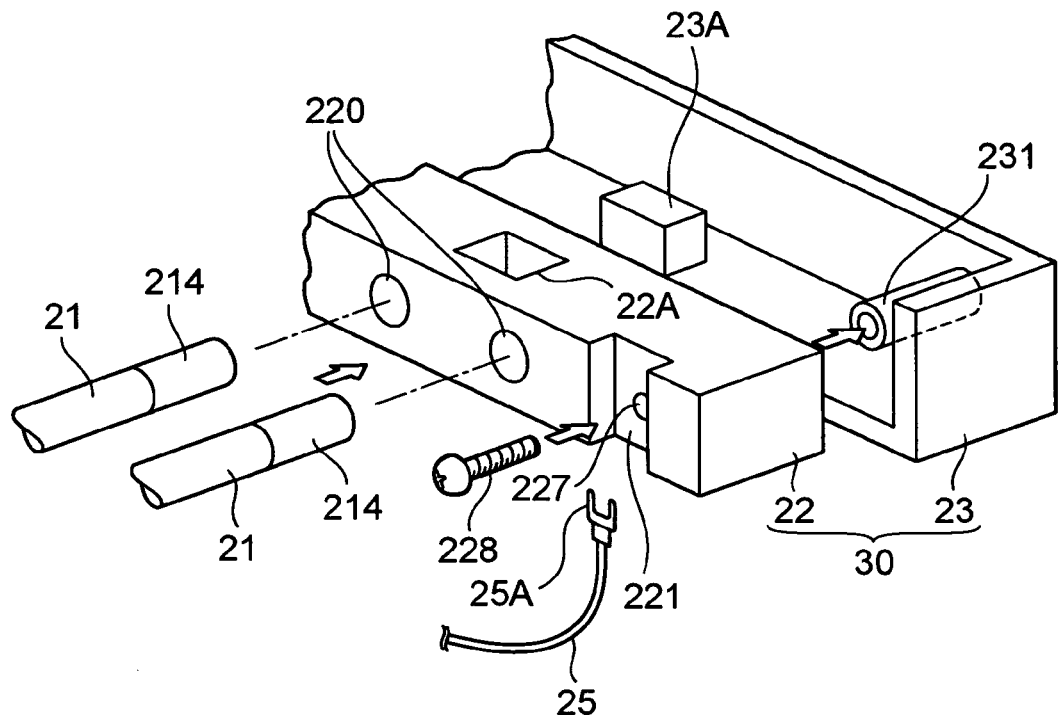
FIG. 5 is an exploded diagram partly showing another embodiment of the socket assembly for the EEFL lamps shown in FIG. 3.
Figure 6:
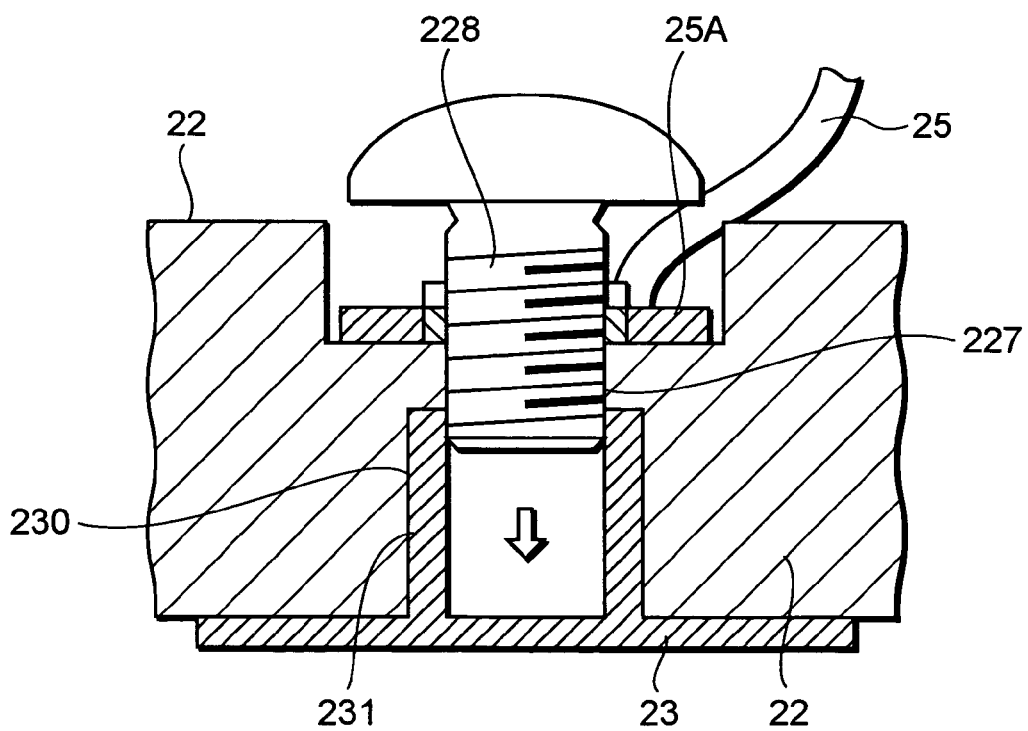
FIG. 6 is a cross section showing a construction of the harness-connecting portion of the socket shown in FIG. 5.

FIG. 5 and FIG. 6 show another embodiment of the socket 22 and the harness-connecting portion, where FIG. 5 is an exploded view of a part concerned and FIG. 6 is a horizontal section. In this embodiment, a screw boss 231 is formed in one body at a position corresponding to the harness-connecting portion 221 of the socket holder 23. On the other hand, a boss-inserting hole 230 for inserting screw boss 231 from the rear side is formed on the harness-connecting portion 221 of the socket 22. And a screw through hole 227 is formed penetrating from the opposite face of the socket 22 to the boss-inserting hole 230, as shown in FIG. 6. A screw 228 is inserted through the screw through hole 227 as mentioned below.

On the other hand, in socket 22, a plurality of (in the figure, only one is illustrated) fixing-holes 22A are formed evenly spaced each other along the longitudinal direction, as shown in FIG. 5. These fixing-holes 22A are formed to penetrate the horizontal plane of the socket 22, and are formed on the conductor between adjacent lamp inserting holes 220. On the socket holder 23, a plurality of (in the figure, only one is illustrated) fixing-projections 23A are formed evenly spaced with each other along the longitudinal direction. These fixing-projections are formed so that an area of cross-sections is somewhat larger than an area of the opening of the fixing-holes 22A of the socket 22.

In assembling the socket assembly 30, the socket 22 is so received in the socket holder 23 that the fixing projection 23A formed on the socket holder 23 is pressed into the fixing hole 22A formed at the corresponding position of the socket 22, thereby fixing the socket 22 on socket holder 23. Then, the screw boss 231 at the end of socket holder 23 is pressed into the boss-inserting hole 230 of the harness-connecting portion 221 of socket 22, thereby combining the socket 22 with socket holder 23.

In assembling a power supply unit or a lighting device 20, the harness connecting terminal 25A at the end of the harness 25 from the high frequency inverter 24 is put on the screw through hole 227 of the harness connecting-portion 221 of the socket 22 and the screw 228 is inserted into the screw through hole 227. The screw 228 is screwed into the screw boss and fixed in a state in which the harness-connecting terminal 25A is in contact with the socket-connecting portion 221 of the socket 22. With the arrangement, the screw boss 231 strengthens the thin-walled harness-connecting portion 221 of the socket 22, which is composed of rather fragile material, and the harness-connecting terminal 25A is fixed with being pressed on to the surface of the harness-connecting portion 221 of the socket 22 by the screw 228.

According to the embodiment, the socket 22 is fixed to the socket holder 23 firmly by pressing a plurality of fixing projections 23A formed along the longitudinal direction of the socket holder 23 into a plurality of fixing holes 22A formed along the longitudinal direction of the socket 22. Since the entire socket 22 is thus supported by the socket holder 23 made of an insulator with high rigidity in the assembled power supply unit or assembled lighting device, contact failure or mechanical destruction can be avoided owing to the external force applied to the EEFL lamps 21 made of slender and fragile glass tubes.

Further, the assembling works for inserting a number of EEFL lamps into the socket 22 becomes easier, because a plurality of fixing holes formed along the longitudinal direction make the socket 22 more flexible.

Figure 7:
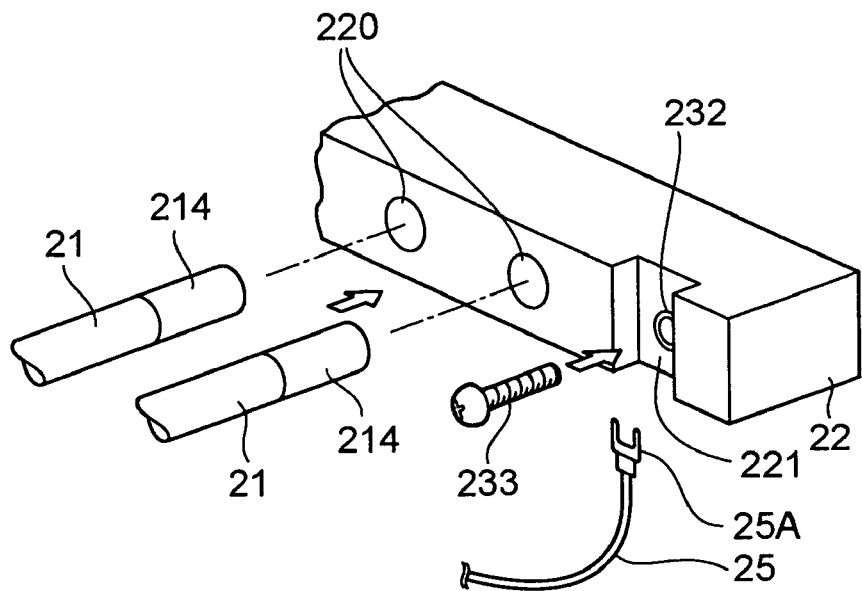
FIG. 7 is an exploded diagram partly showing other embodiment of the socket assembly for the EEFL lamps shown in FIG. 3.
Figure 8:
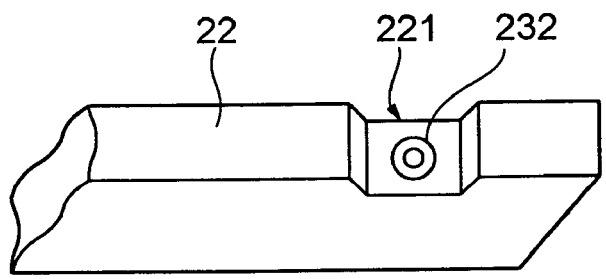
FIG. 8 is a perspective view showing a construction of harness-connecting portion of the socket shown in FIG. 7.
Figure 9A:
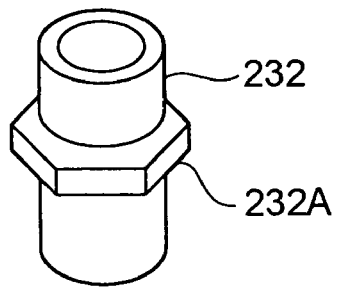
FIG. 9a and FIG. 9b are perspective views showing different examples from the metal nut shown in FIG. 8.
Figure 9B:
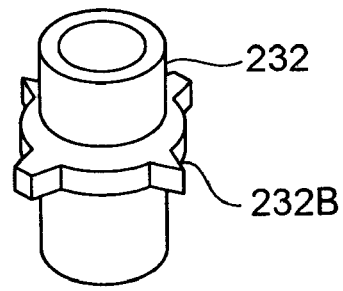

FIG. 7 to FIG. 9 show further different embodiment of the above-mentioned socket 22 and the harness-connecting portion 221. According to the embodiment, a metal nut 232 is formed by burning at the harness-connecting portion 221 at one end of the socket 22, the connecting terminal 25A of the harness 25 connected with the high frequency inverter 24 is fixed to the metal nut 232 with the screw 233.

Besides, according to the embodiment, the metal nut 232 is fixed more strongly to the socket 22 by embedding the metal nut 232 with non circular portion 232A or 232B in the socket 22 made by such a soft and elastic conductor as rubber and by preventing the metal nut 232 from rotation.

What is claimed is:

1. A lighting device according to an embodiment of the present invention comprising:
   a first socket assembly having a first socket which is made of a soft and elastic bar shape conductor, on which a plurality of lamp inserting holes are formed along a longitudinal direction, and a first socket holder in which the socket is received and which is made of an insulator having higher rigidity than the socket wherein the first socket is made of a conductive rubber, which is molded by silicone rubber mixed with carbon black;
   a second socket assembly having a second socket which is made of a soft and elastic bar shape conductor and on which a plurality of lamp inserting holes are formed along a longitudinal direction, and a second socket holder in which the socket is received and which is made of an insulator having higher rigidity than the socket and is placed to face the first socket assembly;
   a plurality of fluorescent lamps having a glass lamp vessel each one end of which is inserted in one of the plurality of lamp inserting holes of the first socket in the first socket assembly, and each other end of which is inserted in one of the plurality of lamp inserting holes of the second socket in the second socket assembly wherein the plurality of fluorescent lamps is a dielectric barrier type discharge lamp having a glass lamp vessel, on both end of which an external electrode is formed; and
   a high frequency power source which supplies a high frequency voltage between the first socket in the first socket assembly and the second socket in the second socket assembly.

2. A lighting device according to claim 1, wherein the first socket is made of a conductive rubber, which is molded by silicone rubber mixed with carbon black of 30 to 40 wt. % and silica of 1 to 10 wt. %.

3. A lighting device according to claim 2, wherein the external electrode of the dielectric barrier type discharge lamp has an outer diameter somewhat larger than the lamp inserting hole of the first or second socket, and has a length with which an end of the external electrode protrudes from the other side of the first or second socket when the external electrode is inserted in the lamp inserting hole.

4. A lighting device according to claim 1, wherein the first or second socket is provided with a harness connection portion, which is a concave portion formed at an end of the socket, and a metal fitting for screwing the harness terminal connected with said high frequency power source is fitted in the concave portion of the harness connection portion.

5. A lighting device according to claim 4, wherein the harness-connecting portion is provided with a metal nut for screwing the harness terminal, which is fixed by burning on the bar shape conductor forming the first or second socket.

6. A lighting device according to claim 5, wherein the metal nut has a peripheral shape of a polygon or a circle with projections.

7. A lighting device according to claim 6, wherein a screw boss is fixed on one end of the first or second socket holder and a insertion hole for inserting the screw boss is formed on one face of the first or the second socket where the harness connecting portion is provided,
   wherein a through hole, which communicates with the inserting hole, is provided on the other face of the first or second socket holder, and
   wherein the first or second socket is fixed on the first or second socket holder respectively, by coupling the screw inserted in the through hole with the screw boss.

8. A lighting device according to claim 1, wherein the first socket is provided with a harness-connecting portion on its one end portion, and the second socket is provided with a harness-connecting portion on its end portion, which is located at an opposite side of the end portion of the first socket, so that each circuit for supplying a high frequency voltage to each of the discharge lamps from the high frequency power source has a nearly equal circuit length.

9. A lighting device according to claim 8, wherein the first or second socket holder is made of a flame resistant insulator, and is constructed to cover the side face of the first or second socket except for the face where the plurality of lamp insertion holes are open.

10. A lighting device according to claim 1, wherein a plurality of fixing protrusions are provided along a longitudinal direction on the first or second socket holder, and a plurality of fixing holes having an opening area somewhat smaller than the cross section of the fixing protrusions are provided along a longitudinal direction on the first or second socket so that the first or second socket is received in the first or second socket holder by pressing the plurality of fixing protrusions into the plurality of fixing holes.

11. A lighting device according to claim 1, wherein the first or second socket is provided with a harness connection portion, which is a concave portion formed at an end of the socket, and a metal fitting for screwing the harness terminal connected with said high frequency power source is fitted in the concave portion of the harness connection portion.

12. A lighting device according to claim 11, wherein the harness-connecting portion is provided with a metal nut for screwing the harness terminal, which is fixed by burning on the bar shape conductor forming the first or second socket.

13. A lighting device according to claim 12, wherein the metal nut has a peripheral shape of a polygon or a circle with projections.

14. A lighting device according to claim 13, wherein a screw boss is fixed on one end of the first or second socket holder and a insertion hole for inserting the screw boss is formed on one face of the first or the second socket where the harness connecting portion is provided,
   wherein a through hole, which communicates with the inserting hole, is provided on the other face of the first or second socket holder, and
   wherein the first or second socket is fixed on the first or second socket holder respectively, by coupling the screw inserted in the through hole with the screw boss.

15. A lighting device according to claim 1, wherein the first socket is provided with the harness-connecting portion on its one end portion, and the second socket is provided with the harness-connecting portion on its end portion, which is located at an opposite side of the end portion of the first socket, so that each circuit for supplying a high frequency voltage to each of the discharge lamps from the high frequency power source has a nearly equal circuit length.

16. A lighting device according to claim 15, wherein the first or second socket holder is made of a flame resistant insulator, and is constructed to cover the side face of the first or second socket except for the face where the plurality of lamp insertion holes are open.

17. A lighting device according to claim 1, wherein the first socket is made of a conductive rubber, which is molded by silicone rubber mixed with carbon black.

18. A lighting device according to claim 17, wherein the first socket is made of a conductive rubber, which is molded by silicone rubber mixed with carbon black of 30 to 40 wt. % and silica of 1 to 10 wt. %.

19. A socket assembly for a fluorescent lamp comprising:
   a first socket assembly including a first socket which is composed of a soft and elastic bar shape conductor which is provided with a plurality of lamp inserting holes along a longitudinal direction, and a first socket holder in which the socket is received and which is made of an insulator having higher rigidity than the socket wherein the first socket is made of a conductive rubber, which is molded by silicone rubber mixed with carbon black; and
   a second socket assembly including a second socket which is made of a soft and elastic bar shape conductor and which is provided with a plurality of lamp inserting holes along a longitudinal direction, and a second socket holder in which the socket is received, which is made of an insulator having higher rigidity than the socket, and which faces the first socket assembly with a space.

20. A socket assembly for a fluorescent lamp according to claim 19, wherein the first socket is made of a conductive rubber, which is molded by silicone rubber mixed with carbon black of 30 to 40 wt. % and silica of 1 to 10 wt. %.

21. A socket assembly for a fluorescent lamp according to claim 20 wherein the first or second socket is provided with a harness-connecting portion, which is a concave portion formed at an end of the socket, and a metal fitting for screwing the harness terminal connected with the high frequency power source is fitted in the concave portion of the harness connecting portion.

22. A socket assembly for a fluorescent lamp according to claim 21, wherein the harness-connecting portion is provided with a metal nut for screwing the harness terminal, which is fixed by burning on the bar shape conductor forming the first or second socket.

23. A socket assembly for a fluorescent lamp according to claim 22, wherein the metal nut has a peripheral shape of a polygon or a circle with projections.

24. A socket assembly for a fluorescent lamp according to claim 23, wherein a screw boss is fixed on one end of the first or second socket holder and a insertion hole for inserting the screw boss is formed on one face of the first or the second socket where the harness connecting portion is provided,
   wherein on the other face of the first or second socket holder, a through hole, which communicates with the inserting hole, is provided, and
   wherein the first or second socket is fixed on the first or second socket holder respectively, by coupling the screw inserted in the through hole with the screw boss.

25. A socket assembly for a fluorescent lamp according to claim 19, wherein a plurality of fixing protrusions are provided along a longitudinal direction on the first or second socket holder, and a plurality of fixing holes having an opening area somewhat smaller than the cross section of the fixing protrusions are provided along a longitudinal direction on the first or second socket, so that the first or second socket is received in the first or second socket holder by pressing the plurality of fixing protrusions into the plurality of fixing holes.

26. A socket assembly for a fluorescent lamp according to claim 25, wherein the first or second socket holder is made of a flame resistant insulator, and is constructed to cover the side face of the first or second socket except for the face where the plurality of lamp insertion holes are open.

27. A power supply unit for a fluorescent lamp comprising:
   a first socket assembly including a first socket which is made of a soft and elastic bar shape conductor which is provided with a plurality of lamp inserting holes along a longitudinal direction, and a first socket holder in which the socket is received and is made of an insulator having higher rigidity than the socket wherein the first socket is made of a conductive rubber, which is molded by silicone rubber mixed with carbon black;
   a second socket assembly including a second socket which is made of a soft and elastic bar shape conductor which is provided with a plurality of lamp inserting holes along a longitudinal direction, and a second socket holder in which the socket is received, which is made of an insulator having higher rigidity than the socket, and which faces the first socket assembly with a space; and a high frequency power source, which supplies a high frequency voltage between the first socket of the first socket assembly and the second socket of the second socket assembly.

28. A power supply unit for a fluorescent lamp according to claim 27, wherein the first socket is composed of a conductive rubber, which is molded by silicone rubber mixed with carbon black of 30 to 40 wt. % and silica of 1 to 10 wt. %.

29. A power supply unit for a fluorescent lamp according to claim 27, wherein the first socket is provided with the harness-connecting portion on its one end portion, and the second socket is provided with the harness-connecting portion on its end portion, which is located at an opposite side of the end portion of the first socket, so that each circuit for supplying a high frequency voltage to each of the plurality discharge lamps of dielectric barrier type from the high frequency power source has a nearly equal circuit length.

* * * * *